(12) United States Patent
Honda (10) Patent No.: US 9,438,832 B2
(45) Date of Patent: Sep. 6, 2016

(54) IMAGE PROCESSING APPARATUS AND IMAGE PROCESSING METHOD

(71) Applicant: CANON KABUSHIKI KAISHA, Tokyo (JP)

(72) Inventor: Yoshiaki Honda, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/751,588

(22) Filed: Jun. 26, 2015

(65) Prior Publication Data

US 2015/0381913 A1    Dec. 31, 2015

(30) Foreign Application Priority Data

Jun. 30, 2014 (JP) .................. 2014-135166

(51) Int. Cl.
*H04N 5/367* (2011.01)
*H04N 9/04* (2006.01)
*H04N 5/217* (2011.01)
*H04N 5/369* (2011.01)
*H04N 5/232* (2006.01)

(52) U.S. Cl.
CPC ............ *H04N 5/367* (2013.01); *H04N 5/2173* (2013.01); *H04N 9/045* (2013.01); *H04N 5/23212* (2013.01); *H04N 5/3696* (2013.01)

(58) Field of Classification Search
None
See application file for complete search history.

(56) References Cited

U.S. PATENT DOCUMENTS

| 2011/0069904 A1* | 3/2011 | Yang ................. G06T 5/002 382/275 |
| 2013/0044956 A1* | 2/2013 | Kawata ............... G06K 9/66 382/192 |
| 2015/0156484 A1* | 6/2015 | Takahama ........... G06K 9/6202 348/187 |
| 2015/0206280 A1* | 7/2015 | Ono ................... H04N 9/045 348/223.1 |
| 2016/0063681 A1* | 3/2016 | Esaki ................. G06T 5/002 382/199 |

FOREIGN PATENT DOCUMENTS

JP    4797606 B    10/2011

* cited by examiner

*Primary Examiner* — Albert Cutler
(74) *Attorney, Agent, or Firm* — Cowan, Liebowitz & Latman, P.C.

(57) ABSTRACT

A first region that includes a target pixel and extends in a first direction, and multiple regions and that are obtained by shifting the first region by a predetermined amount in direction perpendicular to the first direction are set. A first correction value is obtained using multiple pixel values selected in the regions based on correlation values indicating a degree of correlation with the target pixel. The value of the target pixel is corrected using a correction value obtained from the first correction value and the pixel value selected in the first region, with a weight based on the sizes of the correlation value corresponding to the first correction value and the correlation value corresponding to the pixel value selected in the first region.

11 Claims, 11 Drawing Sheets

| G00 | R01 | G02 | R03 | G04 | R05 | G06 | R07 | G08 | R09 | G0a |
|-----|-----|-----|-----|-----|-----|-----|-----|-----|-----|-----|
| B10 | G11 | B12 | G13 | B14 | G15 | B16 | G17 | B18 | G19 | B1a |
| G20 | R21 | G22 | R23 | G24 | R25 | G26 | R27 | G28 | R29 | G2a |
| B30 | G31 | B32 | G33 | B34 | G35 | B36 | G37 | B38 | G39 | B3a |
| G40 | R41 | G42 | R43 | G44 | R45 | G46 | R47 | G48 | R49 | G4a |
| B50 | G51 | B52 | G53 | B54 | X   | B56 | G57 | B58 | G59 | B5a |
| G60 | R61 | G62 | R63 | G64 | R65 | G66 | R67 | G68 | R69 | G6a |
| B70 | G71 | B72 | G73 | B74 | G75 | B76 | G77 | B78 | G79 | B7a |
| G80 | R81 | G82 | R83 | G84 | R85 | G86 | R87 | G88 | R89 | G8a |
| B90 | G91 | B92 | G93 | B94 | G95 | B96 | G97 | B98 | G99 | B9a |
| Ga0 | Ra1 | Ga2 | Ra3 | Ga4 | Ra5 | Ga6 | Ra7 | Ga8 | Ra9 | Gaa |

| G00 | R01 | G02 | R03 | G04 | R05 | G06 | R07 | G08 | R09 | G0a |
|---|---|---|---|---|---|---|---|---|---|---|
| B10 | G11 | B12 | G13 | B14 | G15 | B16 | G17 | B18 | G19 | B1a |
| G20 | R21 | G22 | R23 | G24 | R25 | G26 | R27 | G28 | R29 | G2a |
| B30 | G31 | B32 | G33 | B34 | G35 | B36 | G37 | B38 | G39 | B3a |
| G40 | R41 | G42 | R43 | G44 | R45 | G46 | R47 | G48 | R49 | G4a |
| B50 | G51 | B52 | G53 | B54 | G55 | B56 | G57 | B58 | G59 | B5a |
| G60 | R61 | G62 | R63 | G64 | R65 | G66 | R67 | G68 | R69 | G6a |
| B70 | G71 | B72 | G73 | B74 | G75 | B76 | G77 | B78 | G79 | B7a |
| G80 | R81 | G82 | R83 | G84 | R85 | G86 | R87 | G88 | R89 | G8a |
| B90 | G91 | B92 | G93 | B94 | G95 | B96 | G97 | B98 | G99 | B9a |
| Ga0 | Ra1 | Ga2 | Ra3 | Ga4 | Ra5 | Ga6 | Ra7 | Ga8 | Ra9 | Gaa |

FIG. 8B

|  | | | | 1000 | | | G15 | | | |
|---|---|---|---|---|---|---|---|---|---|---|
| G00 | R01 | G02 | R03 | G04 | R05 | G06 | R07 | G08 | R09 | G0a |
| B10 | G11 | B12 | G13 | B14 | | B16 | G17 | B18 | G19 | B1a |
| G20 | R21 | G22 | R23 | G24 | R25 | G26 | R27 | G28 | R29 | G2a |
| B30 | G31 | B32 | G33 | B34 | G35 | B36 | G37 | B38 | G39 | B3a |
| G40 | R41 | G42 | R43 | G44 | R45 | G46 | R47 | G48 | R49 | G4a |
| B50 | G51 | B52 | G53 | B54 | | B56 | G57 | B58 | G59 | B5a |
| G60 | R61 | G62 | R63 | G64 | R65 | G66 | R67 | G68 | R69 | G6a |
| B70 | G71 | B72 | G73 | B74 | G75 | B76 | G77 | B78 | G79 | B7a |
| G80 | R81 | G82 | R83 | G84 | R85 | G86 | R87 | G88 | R89 | G8a |
| B90 | G91 | B92 | G93 | B94 | | B96 | G97 | B98 | G99 | B9a |
| Ga0 | Ra1 | Ga2 | Ra3 | Ga4 | Ra5 | Ga6 | Ra7 | Ra8 | Ra9 | Gaa |

G55 (label), G95 (label)

|     |     |     |     |     |     |     |     |     |     |     |
|-----|-----|-----|-----|-----|-----|-----|-----|-----|-----|-----|
| G00 | R01 | G02 | R03 | G04 | R05 | G06 | R07 | G08 | R09 | G0a |
| B10 | ✕   | B12 | G13 | B14 | G15 | B16 | G17 | B18 | G19 | B1a |
| G20 | R21 | G22 | R23 | G24 | R25 | G26 | R27 | G28 | R29 | G2a |
| B30 | G31 | B32 | G33 | B34 | G35 | B36 | G37 | B38 | G39 | B3a |
| G40 | R41 | G42 | R43 | G44 | R45 | G46 | R47 | G48 | R49 | G4a |
| B50 | G51 | B52 | G53 | B54 | ✕   | B56 | G57 | B58 | G59 | B5a |
| G60 | R61 | G62 | R63 | G64 | R65 | G66 | R67 | G68 | R69 | G6a |
| B70 | G71 | B72 | G73 | B74 | G75 | B76 | G77 | B78 | G79 | B7a |
| G80 | R81 | G82 | R83 | G84 | R85 | G86 | R87 | G88 | R89 | G8a |
| B90 | G91 | B92 | G93 | B94 | G95 | B96 | G97 | B98 | ✕   | B9a |
| Ga0 | Ra1 | Ga2 | Ra3 | Ga4 | Ra5 | Ga6 | Ra7 | Ga8 | Ra9 | Gaa |

G11 points to the ✕ at row 1, column 1. G55 points to the ✕ at row 5, column 5. G99 points to the ✕ at row 9, column 9.

IMAGE PROCESSING APPARATUS AND IMAGE PROCESSING METHOD

BACKGROUND OF THE INVENTION

1. Field of the Invention

The present invention relates to an image processing apparatus and an image processing method, and in particular relates to a technique for pixel correction.

2. Description of the Related Art

Image capturing apparatuses such as digital cameras capture images use an image sensor such as a CMOS sensor, but since multiple pixels are provided in the image sensor, it is common for defective pixels to exist due to structural causes, causes in the process of manufacturing, external causes after manufacturing, and the like. As a technique for correcting a value of this kind of defective pixel, there is known to be a method of using a pixel value at a position of a defective pixel that is estimated based on normal pixels in the periphery of the defective pixel.

Also, pixels whose pixel values need to be obtained similarly to the defective pixel also exist, although they are not defective pixels. One example is a focus detection pixel such as that disclosed in Japanese Patent No. 4797606. The focus detection pixel disclosed in Japanese Patent No. 4797606 has a light blocking layer that restricts a luminous flux incidence range. Also, no color filter is provided therein. Since the focus detection pixels are provided among the imaging pixels in the image sensor, it is necessary to obtain the pixel values for the positions of the focus detection pixels from the pixel values of the imaging pixels in the periphery thereof in the case of generating a captured image. Hereinafter, in the present specification, a pixel whose pixel value needs to be obtained as with a defective pixel will be referred to as a correction target pixel or a pixel to be corrected, and the process of obtaining the pixel value of a correction target pixel or a pixel to be corrected will be referred to as pixel correction.

The focus detection pixels are also treated similarly to defective pixels, but since they are arranged regularly, there have been cases where the accuracy of correcting defective pixels (imaging pixels) included in the same direction decreases in the case where the focus detection pixels are arranged in one direction, for example.

SUMMARY OF THE INVENTION

The present invention has been made in view of the problem in the prior technology and provides an image processing apparatus and an image processing method according to which accurate correction is possible even in the case where pixels to be corrected exist regularly.

According to an aspect of the present invention, there is provided an image processing apparatus comprising: a setting unit configured to set a first region that includes a target pixel on which pixel correction is to be performed, and that extends in a first direction, and further configured to set a plurality of regions obtained by shifting the first region by a predetermined amount in directions perpendicular to the first direction; a detection unit configured to detect correlation values in each of a plurality of positions in the first region and the plurality of regions by scanning the first region and the plurality of regions using a region of a plurality of pixels including the target pixel as a template; a selection unit configured to select pixel values in the first region and the plurality of regions based on the correlation values; a first obtaining unit configured to obtain a first correction value using a plurality of the selected pixel values; a second obtaining unit configured to obtain a weight for the first correction value based on a magnitude of a first correlation value, which is obtained using the correlation values for pixel values that are used for obtaining the first correction value, and a magnitude of the correlation value for the pixel value selected in the first region; a third obtaining unit configured to obtain a second correction value based on the first correction value and the pixel value selected in the first region, using the weight; and a correction unit configured to correct the value of the target pixel using the second correction value.

According to another aspect of the present invention, there is provided an image processing method comprising: a setting step of setting a first region that includes a target pixel on which pixel correction is to be performed, and that extends in a first direction, and setting a plurality of regions obtained by shifting the first region by a predetermined amount in directions perpendicular to the first direction; a detecting step detecting correlation values in each of a plurality of positions in the first region and the plurality of regions by scanning the first region and the plurality of regions using a region of a plurality of pixels including the target pixel as a template; a selecting step of selecting pixel values in the first region and the plurality of regions based on the correlation values; a first obtaining step of obtaining a first correction value using a plurality of the selected pixel values; a second obtaining step of obtaining a weight for the first correction value based on a magnitude of a first correlation value, which is obtained using the correlation values for the pixel values that are used for obtaining the first correction value, and a magnitude of the correlation value for the pixel value selected in the first region; a third obtaining step of obtaining a second correction value based on the first correction value and the pixel value selected in the first region, using the weight; and a correcting step in which a correction unit corrects the value of the target pixel using the second correction value.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings.

First Embodiment

Note that although embodiments will be described here in which the present invention is applied to a digital camera, the digital camera is merely an example of an image processing apparatus according to the present invention. The present invention can be carried out not only in an electronic device with an image capturing function, but also an electronic device without an image capturing function.

Figure 1:
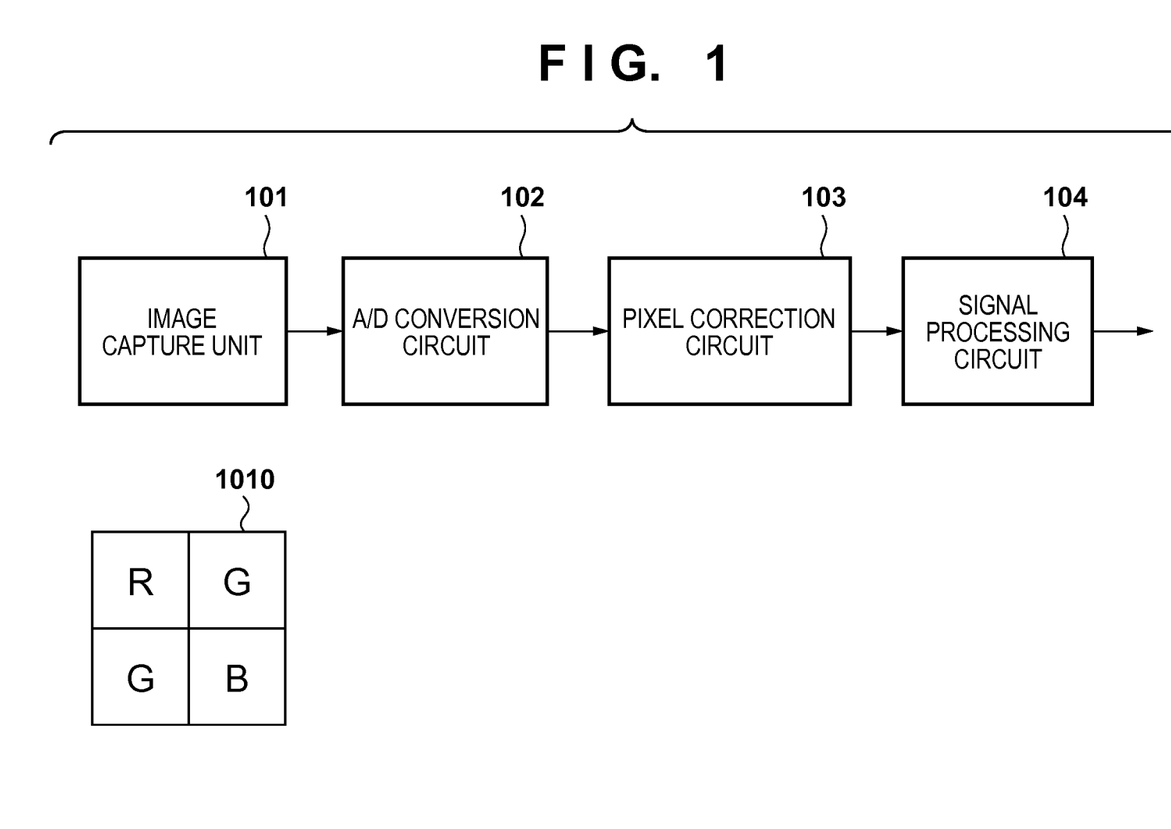
FIG. 1 is a block diagram showing an example of a functional configuration of a digital camera according to an embodiment.

FIG. 1 is a block diagram showing an example of a functional configuration of a digital camera to which the present invention can be applied. Here, in order to simplify the description and facilitate understanding thereof, only configurations related to pixel correction are shown, and other configurations commonly included in a digital camera (operation unit, display apparatus, configuration relating to image storage, etc.) are not shown in the drawings.

An image capture unit 101 has an image capture lens (image capture optical system), an image sensor, and a driving circuit therefor, and converts an optical image formed by the image capture lens on an imaging plane of the image sensor into an electrical signal. Note that in the present embodiment, the image sensor is a CCD or CMOS image sensor having a color filter with a primary-color Bayer arrangement 1010. An analog image signal output from the image capture unit 101 is converted into a digital image signal by an A/D conversion circuit 102. Among the image signals converted into digital signals by the A/D conversion circuit 102, a signal value of a pixel determined as a correction target pixel is corrected by the pixel correction circuit 103 and the pixel correction circuit 103 outputs a RAW image signal resulting from defect correction. The signal processing circuit 104 applies a publicly-known white balance circuit, a demosaicing circuit, and signal processing such as noise reduction processing, gamma processing, and matrix processing to the RAW image signal. The output of the signal processing circuit 104 is used for storage and display.

Note that the pixel correction circuit 103 may obtain a digital image signal from a storage medium mounted in the digital camera, a built-in storage apparatus, or an external apparatus communicably connected thereto. The pixel correction circuit 103 can identify the position of the pixel to be corrected using the obtained digital image signal, regardless of the source from which it is obtained.

The pixel correction circuit 103 can identify the position of the correction target pixel using any known method. To give non-limiting examples, the positional information of the correction target pixel may be included as additional information in the digital image signal, and the positional information of the correction target pixel may be registered in advance in the digital camera. Also, the position of the correction target pixel may be identified dynamically by identifying an abnormal output pixel based on image data obtained in a state in which light is blocked when a power source is turned on, for example. Static positional information may be used in combination with the dynamically-measured positional information of the correction target pixel.

Figure 2A:
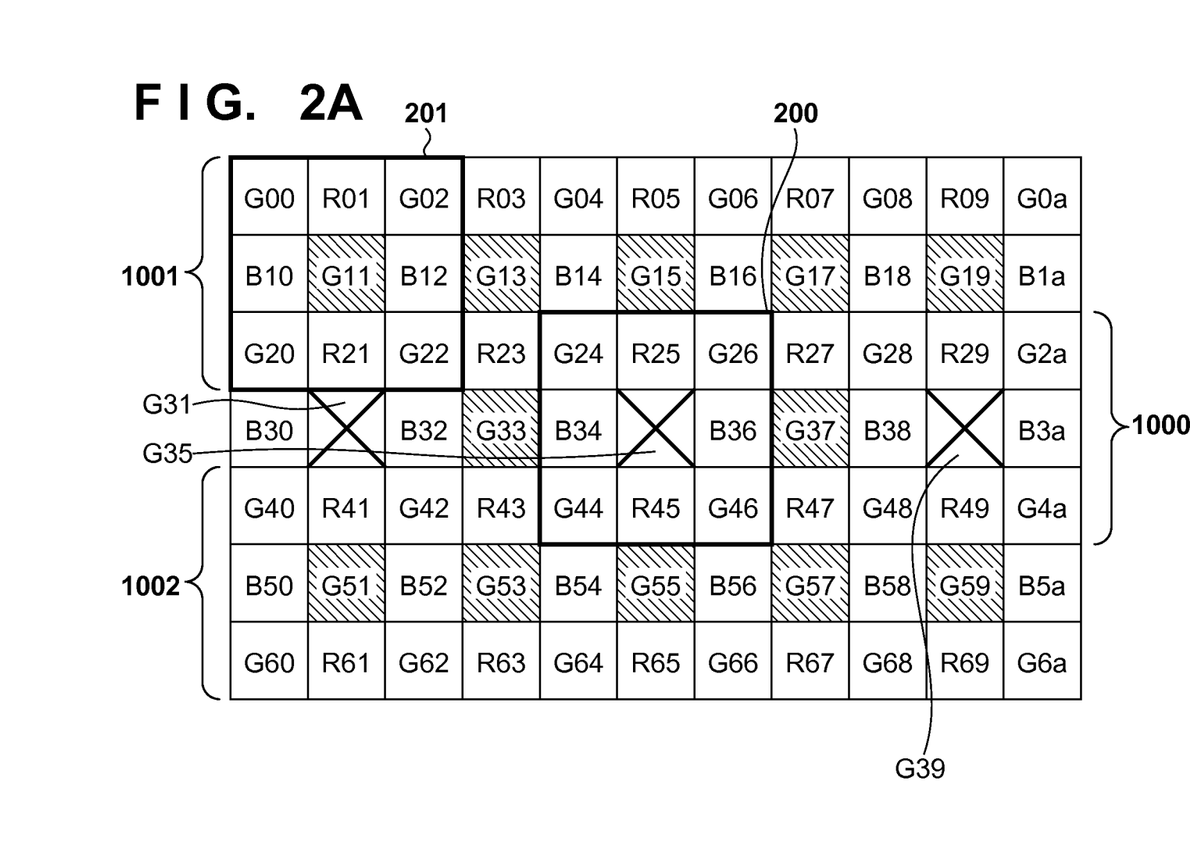
FIGS. 2A and 2B are diagrams illustrating defective pixel correction processing according to an embodiment.

Next, an example of a specific operation of a correction operation of the pixel correction circuit 103 will be described. FIG. 2A shows a portion of the pixel arrangement in the image sensor. Here, the leading R, G, or B in each pixel indicates a red pixel, green pixel, or blue pixel respectively, the first value thereafter indicates the coordinate in the vertical direction, and the second value indicates the coordinate in the horizontal direction using an orthogonal coordinate system in which a pixel in the upper left is (0,0) and the values increase in the downward and rightward directions. Accordingly, this means that R23 is the pixel that is 3rd from the top and 4th from the left, and is a red-colored pixel.

As described above, among the pixels that are to be corrected as defective pixels, not only true defective pixels (pixels according to which, contrary to intentions, normal output is not obtained) but also pixels handled as defective pixels, such as focus detection pixels are included. In the following description, this kind of correction target pixel or pixel to be corrected will be referred to as a defective pixel for the sake of convenience. Also, among the defective pixels, pixels that are targeted in correction processing will be referred to as target pixels.

As an example in which the defective pixels exist in one direction, FIG. 2A shows an example in which defective pixels exist at a four-pixel period and at G pixel positions (G31, G35, G39, . . . ) in the horizontal pixel line of the fourth row. The defective pixels may be focus detection pixels. The direction in which the defective pixels are arranged may be included in the positional information of the defective pixels, and it may be detected from the positional information of the defective pixels. The pixel line that includes the target pixel and extends in the direction in which the defective pixels are arranged will be referred to as the target line. Here, a defective pixel correction method in the case where G35 is used as the target pixel will be described.

Figure 2B:
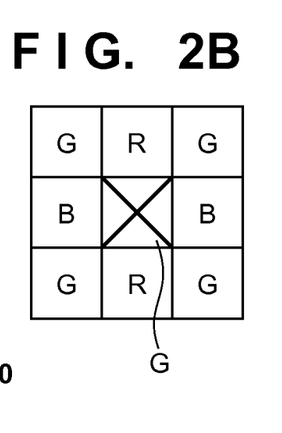

Here, as an example of a correction method, regions with high correlation values are searched for by scanning within predetermined ranges using a region of multiple pixels centered about the target pixel (here, a 3×3-pixel region), such as that shown in FIG. 2B, as a template. At this time, a sum of absolute differences (hereinafter, SAD), which is obtained using the scanning positions of the eight peripheral pixels other than the central pixel, is used as an index indicating the degree of correlation. The correction value is calculated using the pixel values of a region that is thought to have a high correlation with the 3×3-pixel region centered about the target pixel.

For example, SAD11, which indicates the correlation between the 3×3-pixel region 200 centered about the target pixel G35 and the 3×3-pixel region 201 centered about G11, can be obtained as follows.

$$SAD11 = ABS(G00-G24) + ABS(R01-R25) + ABS(G02-G26) + ABS(B10-B34) + ABS(B12-B36) + ABS(G20-G44) + ABS(R21-R45) + ABS(G22-G46) \quad \text{(equation 1)}$$

In this way, the SAD is the sum of the absolute differences between pixels at corresponding positions, which is calculated using the eight pixels that are not the central pixel. Note that the size of the region for obtaining the SAD can be set arbitrarily, but in the present embodiment, it is 3×3 pixels in size.

A region obtained by extending a 3×3-pixel region including a target pixel in the arrangement direction of the defective pixels or in the direction of the target line (here, the horizontal direction) is a first region 1000. Also, regions at positions reached by moving the first region 1000 by a predetermined amount (here, moving by two pixels) in two directions (here, the upward direction and the downward direction) perpendicular to the direction of the target line are referred to as a second region 1001 and a third region 1002 respectively.

Also, in the first region 1000,

SAD33 between a region 200 centered about a target pixel and a region centered about G33, and SAD37 between the region 200 and the region centered about G37 are obtained.

Also, in the second region 1001,

SAD11 between the region 200 and the region centered about G11,

SAD13 between the region 200 and the region centered about G13,

SAD15 between the region 200 and the region centered about G15,

SAD17 between the region 200 and the region centered about G17, and

SAD19 between the region 200 and the region centered about G19 are obtained.

Also, in the third region 1002,

SAD51 between the region 200 and the region centered about G51,

SAD53 between the region 200 and the region centered about G53,

SAD55 between the region 200 and the region centered about G55,

SAD57 between the region 200 and the region centered about G57, and

SAD59 between the region 200 and the region centered about G59 are obtained.

In FIG. 2A, the central pixels of the regions for obtaining the SADs in the case where the target pixel is G35 are indicated by hatching. Thus, in the present embodiment, a region with a high correlation is searched for among regions centered about pixels of the same color as that of the target pixel position in the search region, the regions excluding the region centered about the defective pixel. However, this is an example, and the size of the search region, interval of the regions for obtaining SADs, and the like are not limited to this example.

Figure 3A:
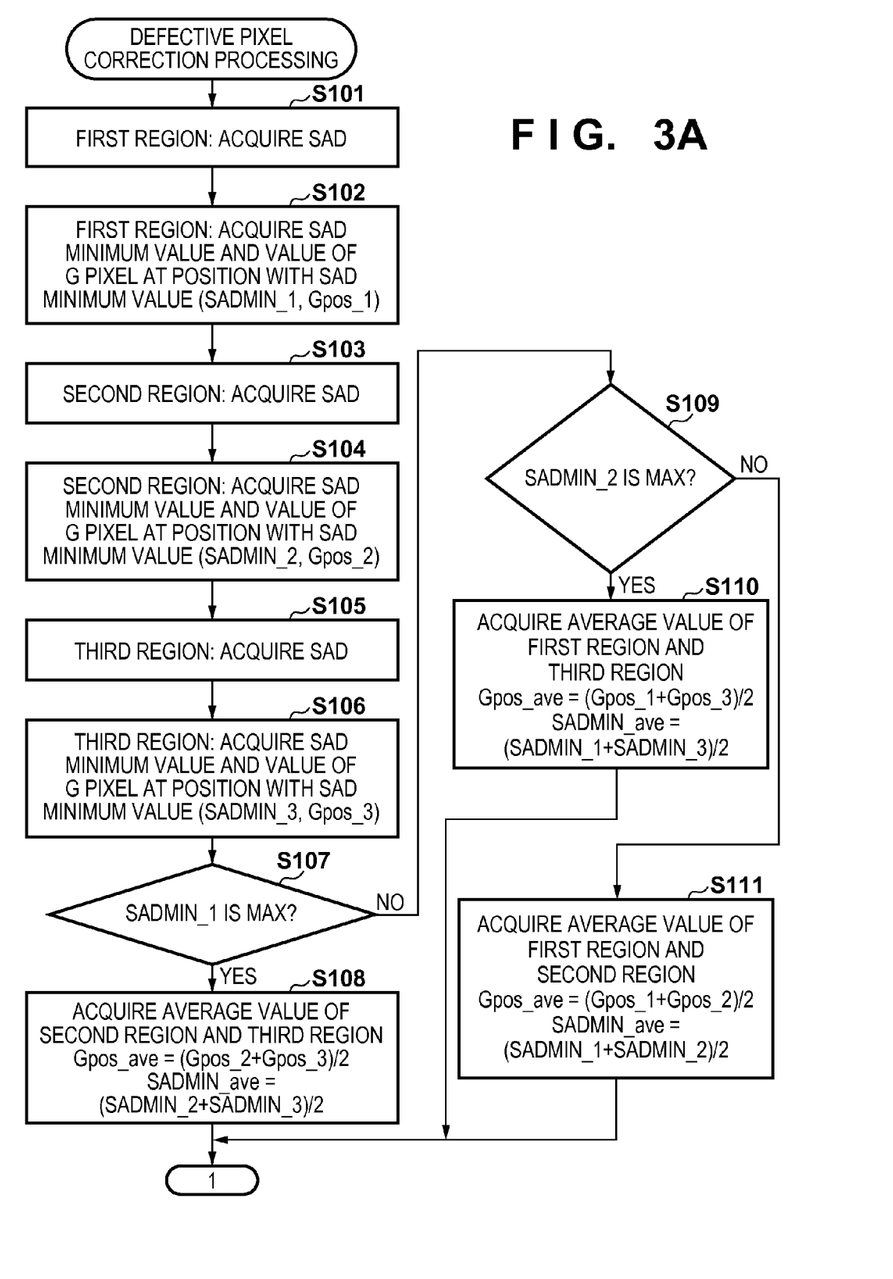
FIGS. 3A and 3B are flowcharts for illustrating defective pixel correction processing according to an embodiment.

A correction operation performed by the pixel correction circuit 103 on the basis of this kind of search operation will be described with reference to the flowchart shown in FIGS. 3A and 3B. It is mainly the pixel correction circuit 103 that performs the operations of the following steps. Note that the pixel correction circuit 103 may be realized using an integration circuit such as an ASIC, or it may be realized by a programmable processor using software.

In step S101, correlation indexes for the first region 1000 (SAD33 and SAD37) are obtained.

In step S102, a minimum value SADMIN_1 of the SADs obtained in the first region 1000 and a G pixel value (central pixel value in the region where the SAD is the smallest) Gpos_1 for the position where the SAD is the minimum value are obtained. Regarding the first region 1000, if SAD33 is smaller than SAD37, SAD33 is the minimum value, and Gpos_1 takes on the value of G33. Conversely, if SAD33 is larger than SAD37, SAD37 is the minimum value, and Gpos_1 takes on the value of G37. Alternatively, Gpos_1 may be the average value of the G pixels in the region centered about G37 (G26, G28, G37, G46, and G48).

In step S103, correlation indexes for the second region 1001 (SAD11, SAD13, SAD15, SAD17, and SAD19) are obtained.

In step S104, similarly to step S102, the SAD minimum value SADMIN_2 of the second region 1001 and the G pixel value Gpos_2 at the position with the SAD minimum value are obtained. For example, if the SAD minimum value of the second region 1001 is SAD11, Gpos_2 takes on the value of G11. Alternatively, Gpos_2 may be the average value of the G pixels in the region centered about G11 (G00, G02, G11, G20, and G22).

In step S105, correlation indexes for the third region 1002 (SAD51, SAD53, SAD55, SAD57, and SAD59) are obtained.

In step S106, similarly to steps S102 and S104, the SAD minimum value SADMIN_3 of the third region 1002 and the G pixel value Gpos_3 at the position with the SAD minimum value are obtained. For example, if the SAD minimum value in the third region 1002 is SAD51, Gpos_3 takes on the value of G51. Alternatively, Gpos_3 may be the average value of the G pixels in the region centered about G51 (G40, G42, G51, G60, and G62).

In steps S107 to S111, the pixel correction circuit 103 compares the minimum SAD values obtained in the three regions (SADMIN_1, SADMIN_2, SADMIN_3). Then, the average value of pixel values corresponding to the two smaller SAD values (here, since there are three total, the average value excludes the largest SAD value) is obtained as a first correction value.

Specifically, the SAD minimum values from the first region 1000 to the third region 1002 (SADMIN_1, SADMIN_2, SADMIN_3) are compared first in step S107. Also, if SADMIN_1 is the largest, the processing moves to step S108, and the average of SADMIN_2 and SADMIN_3 is obtained as the average SAD minimum value SADMIN_ave. Also, the average of Gpos_2 and Gpos_3 is obtained as the average G pixel value Gpos_ave, and the processing moves to step S112 (FIG. 3B).

In step S107, if SADMIN_1 is not the largest, the processing moves to step S109, and it is determined whether or not SADMIN_2 is the largest. If SADMIN_2 is the largest, the processing moves to step S110, and the average of SADMIN_1 and SADMIN_3 is obtained as the average SAD minimum value SADMIN_ave. Also, the average of Gpos_1 and Gpos_3 is obtained as the average G pixel value Gpos_ave, and the processing moves to step S112.

In step S109, if SADMIN_2 is not the largest, SADMIN_3 is the largest, and therefore the processing moves to step S111, and the average of SADMIN_1 and SADMIN_2 are obtained as the average SAD minimum value SADMIN_ave. Also, the average of Gpos_1 and Gpos_2 is obtained as the average G pixel value Gpos_ave, and the processing moves to step S112 (FIG. 3B).

Thus, in the present embodiment, instead of using one G pixel value (Gpos) corresponding to the minimum value of SADMIN_1 to SADMIN_3, multiple G pixel values (here, G pixel values in the regions with the smallest value and the second smallest value) are used to obtain Gpos_ave (first correction value). This is performed so that the final correction value relies less on (is less sensitive to) the G pixel value corresponding to the smallest value of SADMIN_1 to SADMIN_3. If there is high sensitivity, the corrected target pixel will look unnatural in some cases.

Note that here, the arithmetic average of the pixel values corresponding to the two smallest values among the three smallest SADs obtained in the first to third regions 1000 to 1002 were obtained, but another method may be used, such as obtaining a weighting addition average corresponding to two SAD values. The weight in the case of obtaining the weighting addition average can be configured for example, such that the weight of the smaller value is increased the larger the difference between the values is. Also, if the number of regions is greater than three, three or more pixel values may be used to obtain Gpos_ave (first correction value).

In the present embodiment, the pixel correction circuit 103 obtains the final correction value (second correction value) using weighting addition of Gpos_1, which corresponds to SADMIN_1, and Gpos_ave. This is performed in order to suppress a reduction in the accuracy of the correction value that can occur when the first region 1000 and the second and third regions 1001 and 1002 correspond to different subjects.

Figure 4:
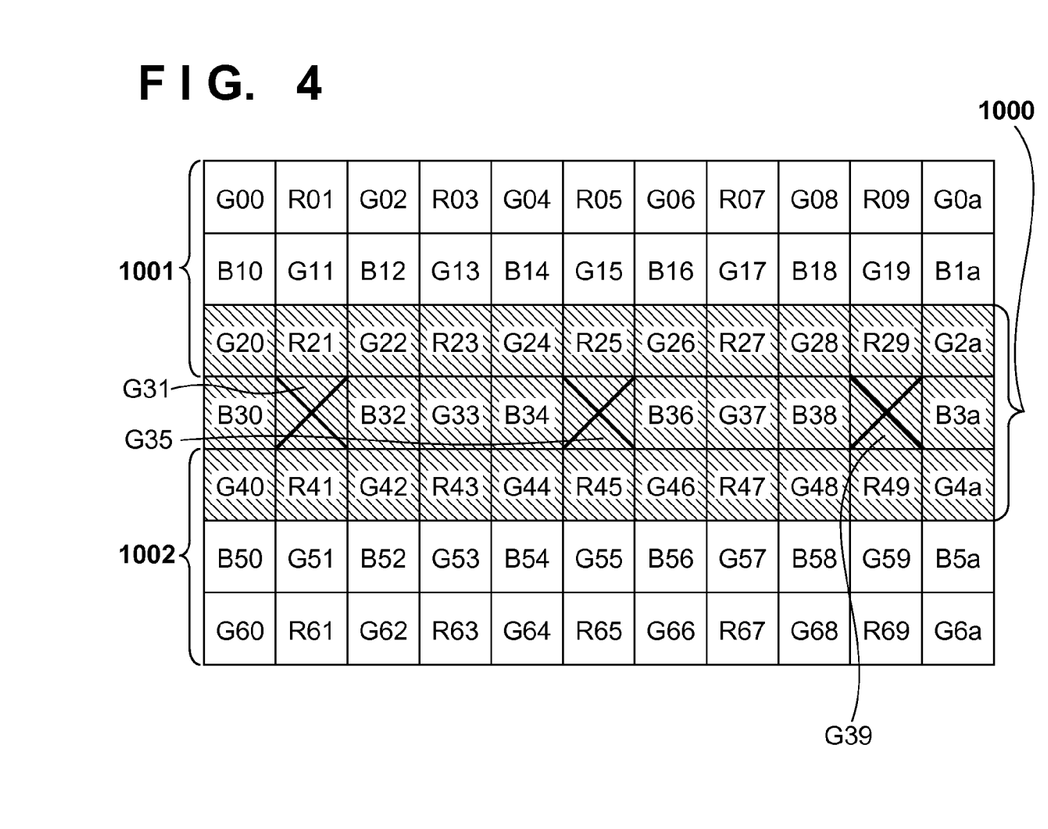
FIG. 4 is a diagram illustrating an example of setting a region according to an embodiment.

As shown in FIG. 4, a case is considered in which there is a subject (here, a horizontal line) having an edge in the length direction of the first region 1000 (direction in which the multiple defective pixels are arranged). In this case, the brightness value of the first region 1000 (gray region) is lower in comparison to the brightness value of the second and third regions 1001 and 1002. As compared to the case of using pixel values of the same color of at least one of the second region 1001 and the third region 1002, a correction value is obtained with higher accuracy by using only pixel values of the same color in the first region 1000.

In the case where such a subject exists, SADMIN_1 will be smaller, and SADMIN_2 and SADMIN_3 will be larger. Accordingly, if SADMIN_1 is significantly smaller in comparison to SADMIN_2 (or SADMIN_3), it is thought that there is a high possibility that the subject is a subject such as that shown in FIG. 4. In this case, a decrease in the correction accuracy in the case where the first region 1000 and the second and third regions 1001 and 1002 correspond to different subjects is suppressed by increasing the weight of the G pixel values of the first region 1000 in the weighting addition for obtaining the final correction value.

Figure 3B:
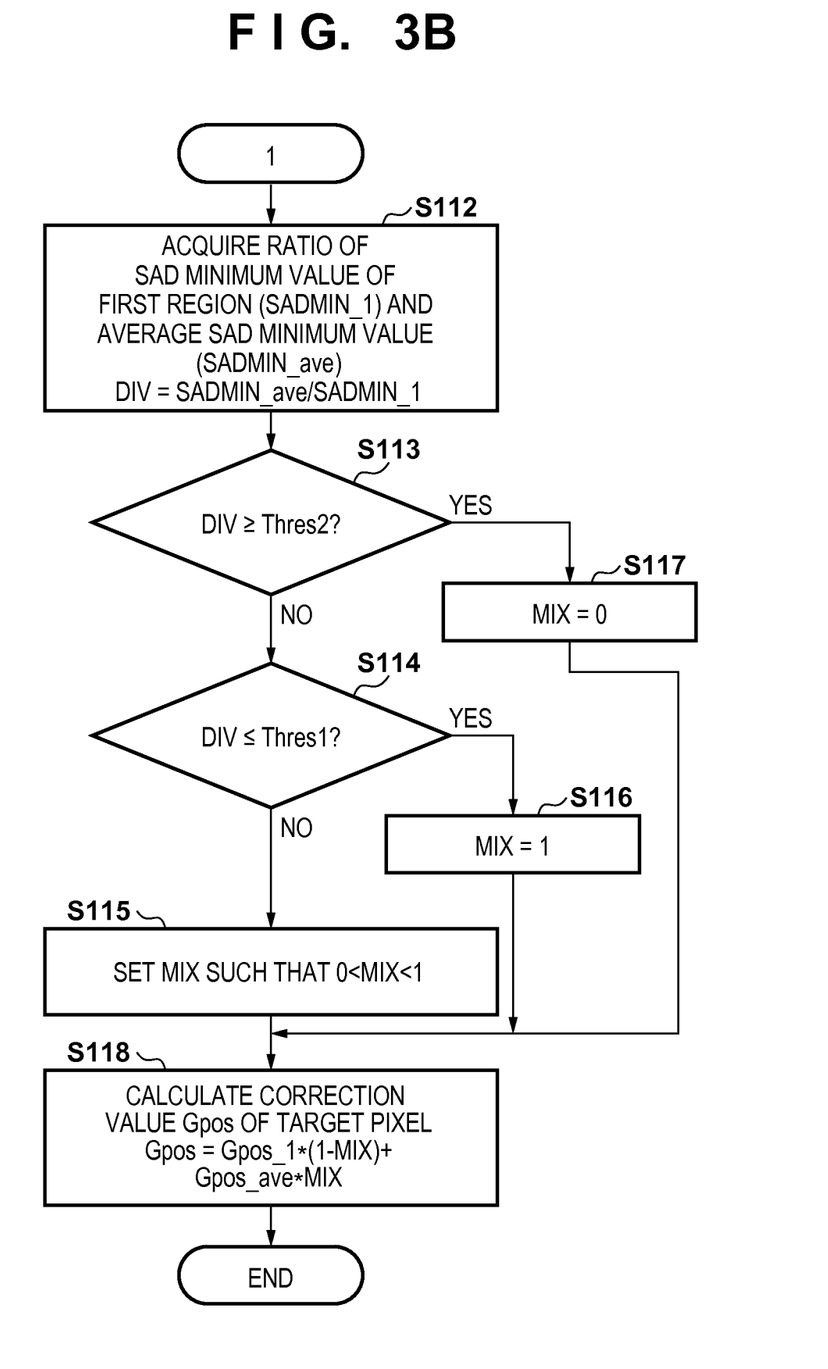

Returning to the description of FIG. 3B, in steps S112 to S117, the pixel correction circuit 103 obtains the above-described weight. First, in step S112, a ratio DIV of the average SAD minimum value SADMIN ave obtained in steps S108 to S111, with respect to the SADMIN_1 obtained in step S102, is obtained as follows.

$$DIV=(SADMIN\_ave)/(SADMIN\_1) \quad \text{(equation 2)}$$

Next, in step S113, if DIV is greater than or equal to a threshold value (greater than or equal to Thres2) (DIV≥Thres2), the processing moves to step S117. The determination in step S113 is a determination of whether or not SADMIN_ave is significantly larger than SADMIN_1, or in other words, whether or not the subject is a subject such as that described with reference to FIG. 4. Accordingly, the value of the threshold value Thres2 and a value appropriate for that kind of determination are determined in advance by experimentation or the like.

As described above, if the value of DIV is large, there is a high possibility that the first region 1000 and the other regions (the second and third regions 1001 and 1002) correspond to different subjects. Accordingly, in step S117, by setting 0 as the weight MIX of Gpos_ave for when obtaining the final correction value, only the values of the pixels of the same color in the first region are used to obtain the correction value.

On the other hand, in step S113, if DIV is less than or equal to the threshold value (less than or equal to Thres2) (DIV≤Thres2), the processing moves to step S114, and DIV is compared to a threshold value Thres1 (Thres1<Thres2). The threshold value Thres1 is a threshold value for determining whether or not using only Gpos_ave will result in greater accuracy in the correction value, and a value appropriate for this kind of determination is determined in advance using experimentation or the like. Then, if DIV is less than or equal to the threshold value (Thres1 or less) (DIV≤Thres1), the processing moves to step S116, 1 is used as the weight MIX of the Gpos_ave for when obtaining the final correction value, and only Gpos_ave is used to obtain the correction value.

If DIV is greater than the threshold value Thres1 in step S114 (Thres1<DIV<Thres2), the processing moves to step S115, and the weight MIX of Gpos_ave for obtaining the final correction value is obtained using linear interpolation. As described above, MIX=0 in the section where DIV≥Thres2 and MIX=1 in the section where DIV≤Thres1, and therefore the weight MIX in the segment where Thres1<DIV<Thres2 is set according to the following equation.

$$MIX=(Thres2-DIV)/(Thres2-Thres1) \quad \text{(equation 3)}$$

Figure 5:
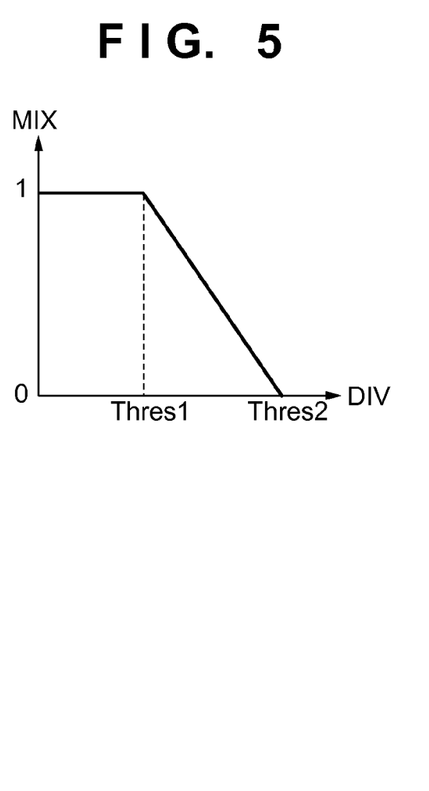
FIG. 5 is a diagram showing an example of weight in weighting addition according to an embodiment.

FIG. 5 shows the relationship between the value of DIV and the threshold value in the present embodiment.

When the value of MIX is determined in the manner described above, the processing moves to step S118, and the pixel correction circuit 103 obtains the final correction value (second correction value). Specifically, weighting addition compositing is performed on the G pixel values corresponding to the smallest SAD in the first region 1000 (Gpos_1) and Gpos_ave (first correction value), which is obtained from the G pixel values corresponding to the two smaller of the minimum SADs of the first to third regions 1000 to 1002.

$$Gpos=(Gpos\_1\times(1-MIX))+(Gpos\_ave\times MIX) \quad \text{(equation 4)}$$

Then, the pixel correction circuit 103 performs correction of the target pixel value by using the thus-obtained correction value Gpos as the value of the target pixel. Note that the correction method is not limited to this, and it is possible to use another method, such as correcting the correction value using the value of a pixel that is the same color as the target pixel and is included in the 3×3 region, for example. The processing above is executed in sequence using the defective pixels as the target pixels.

As described above, in the present embodiment, the regions for obtaining the correction value for correcting one of multiple defective pixels arranged in one direction are a first region that includes the correction target defective pixel and extends in the direction in which the defective pixels are arranged, and two other regions adjacent in directions perpendicular to the direction in which the defective pixels are arranged. Also, pixels with a high correlation with the correction target defective pixel are detected in the regions so as to obtain a correlation value (first correlation value) obtained from the larger two of three detected pixel correlation values, and a corresponding correction value (first correction value). A final correction value (second correction value) is obtained by subjecting a first correction amount and a second correction amount to weighting addition using a weight corresponding to the relationship between the correlation value obtained from the plurality of the three detected pixel correlation values, and the correlation value of the pixel detected in the first region.

By generating the first correction value based on multiple pixel values, it is possible to reduce the sensitivity of the correction value more than in the case of using one pixel value with the highest correlation, and it is possible to suppress a case where the corrected defective pixel looks unnatural. Also, by increasing the weight of the pixel values detected in the first region according to the difference between the correlation amount corresponding to the pixel value detected in the first region and the correlation amount corresponding to the first correction value, it is possible to suppress a decrease in the accuracy of the correction value for a subject having an edge in the direction in which the defective pixels are arranged. Accordingly, even if the defective pixels exist regularly, high-accuracy defective pixel correction can be realized.

Note that the present embodiment has described a case in which defective pixels exist at G pixel positions, but it is sufficient that similar processing is performed in the case where they exist at the positions of R pixels or B pixels as well.

Second Embodiment

Hereinafter, a second embodiment of the present invention will be described. The first embodiment described a case in which it is known that the direction in which the defective pixels are arranged is the horizontal direction. However, as stated in the first embodiment as well, it is also possible to detect the direction in which the defective pixels are arranged. The present embodiment will describe a case in which the direction in which the defective pixels are arranged is set or determined based on the positions of defective pixels in the periphery of a target pixel.

Figure 6:
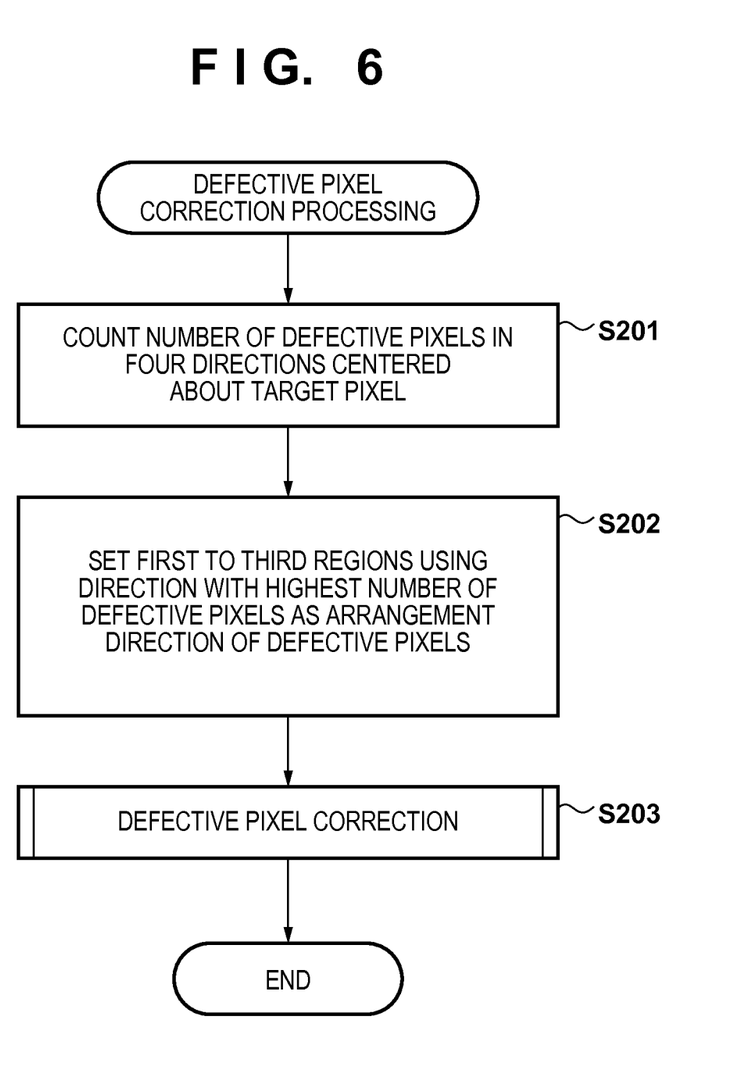
FIG. 6 is a flowchart for illustrating defective pixel correction processing according to a second embodiment.

FIG. 6 is a flowchart showing defective pixel correction processing performed by the pixel correction circuit 103 in the present embodiment. Note that in FIG. 6, the processing of step S203 is similar to the processing described with reference to FIGS. 3A and 3B, and it is a feature of the present embodiment that steps S201 and S202 for detecting the direction in which the defective pixels are arranged are performed before the processing of step S203.

Figure 7:
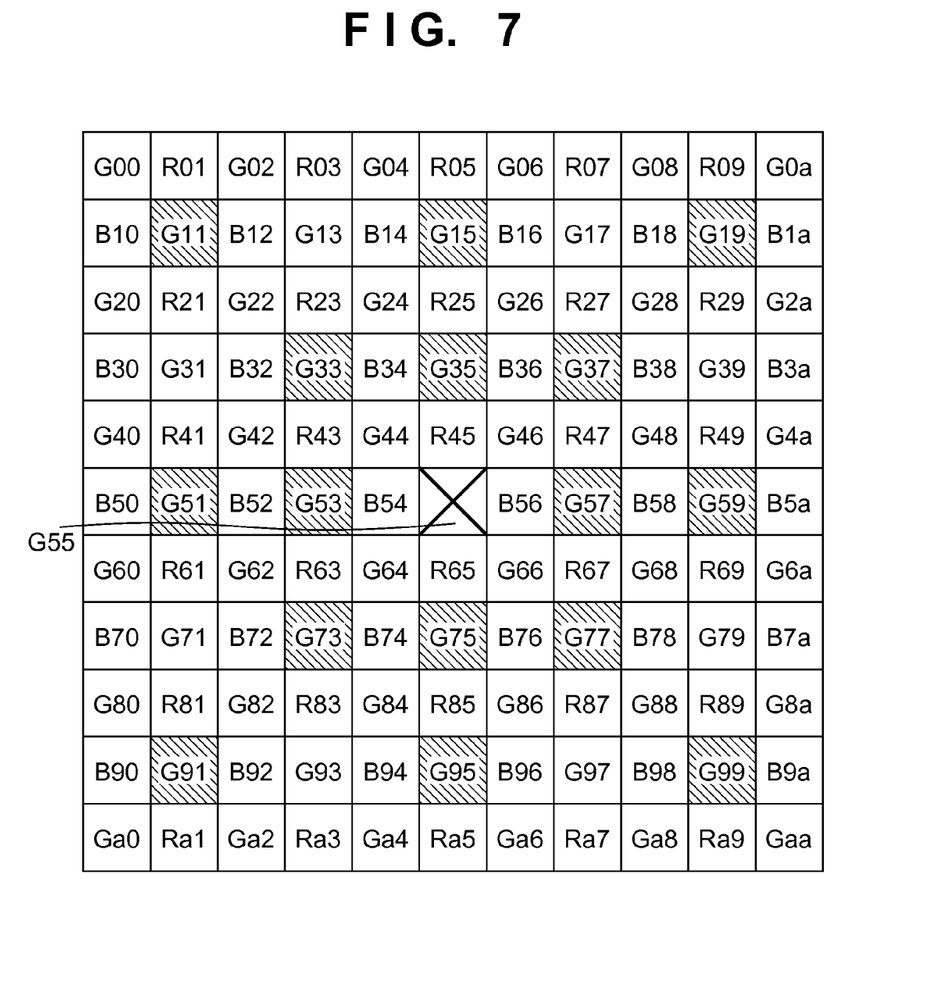
FIG. 7 is a diagram for illustrating the second embodiment of the present invention.

In step S201, based on the positional information of the defective pixel, the pixel correction circuit 103 detects the number of defective pixels with the same color as the target pixel in multiple pixel lines with different length directions that pass through the target pixel. For example, if G55 in FIG. 7 is used as the target pixel, the number of defective pixels in G pixel positions is counted in pixel lines of four directions centered about the target pixel, namely the horizontal direction, the vertical direction, the 45-degree direction, and the 135-degree direction. Here, the number of defective pixels included in five pixels of the same color centered about the target pixel is counted in each pixel line. In FIG. 7, the pixels that would be counted are shown in gray.

More specifically, in the horizontal direction, the number of defective pixels included in G51, G53, G57, and G59 is counted. Also, in the vertical direction, the number of defective pixels included in G15, G35, G75, and G95 is counted. In the 45-degree direction, the number of defective pixels included in G19, G37, G73, and G91 is counted. In the 135-degree direction, the number of defective pixels included in G11, G33, G77, and G99 is counted.

Figure 8A:
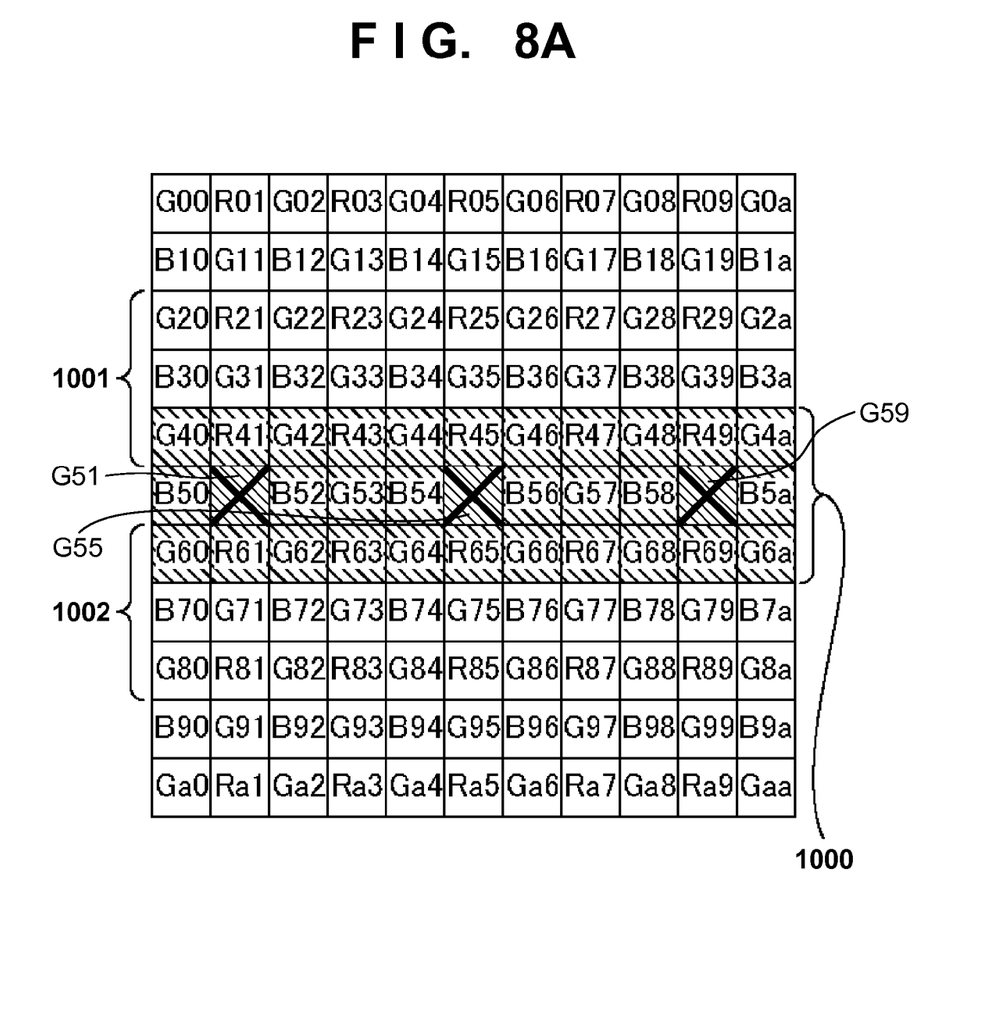
FIGS. 8A to 8D are diagrams for illustrating the second embodiment of the present invention.
Figure 8B:
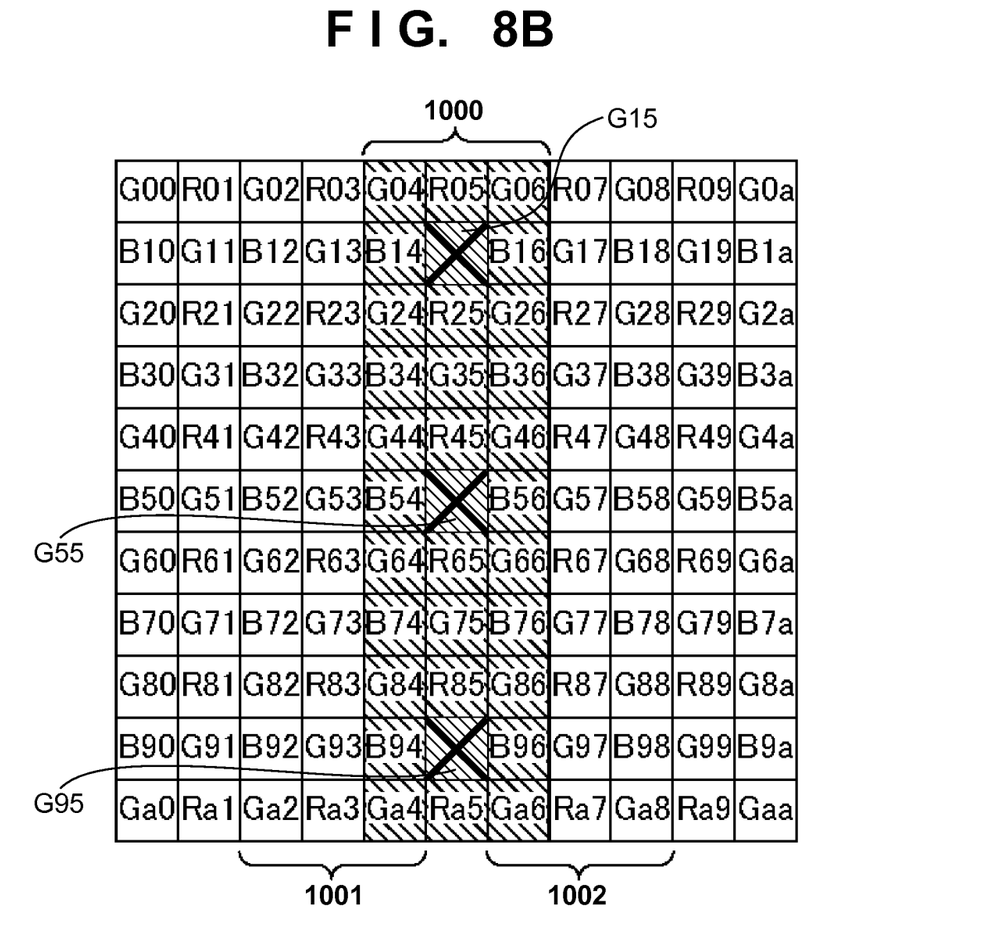
Figure 8C:
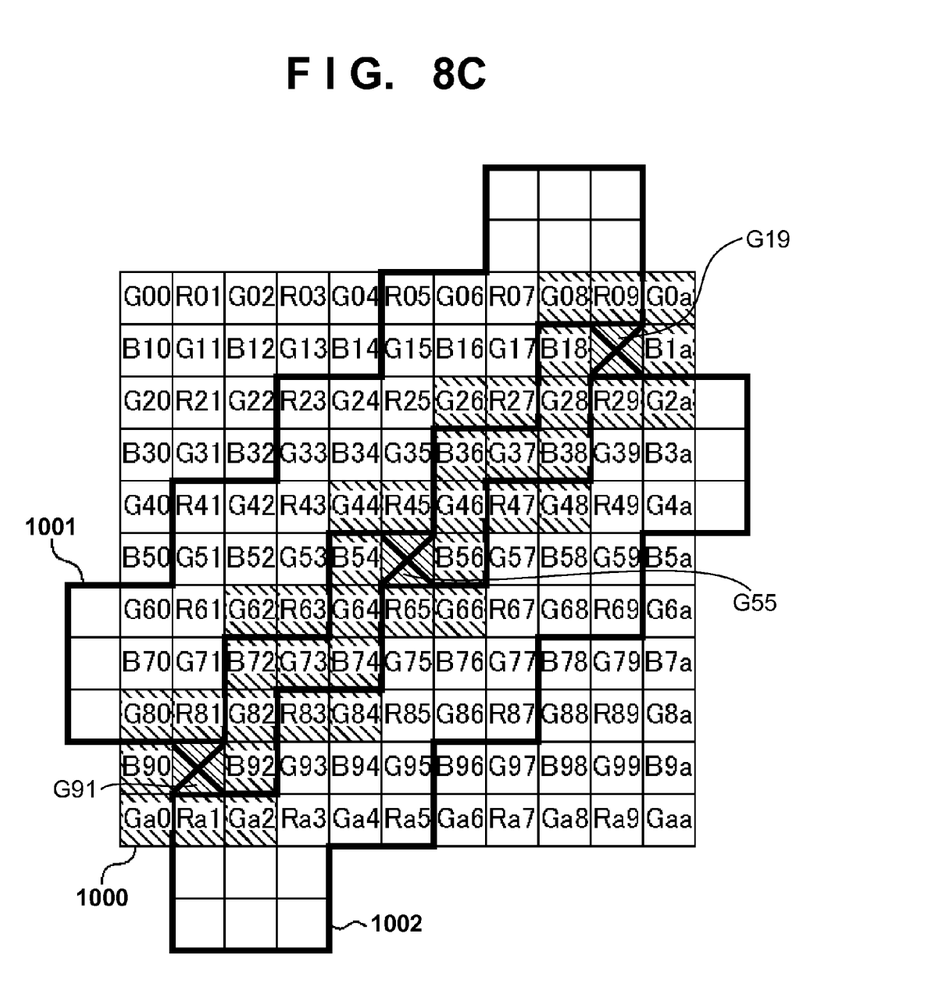
Figure 8D:
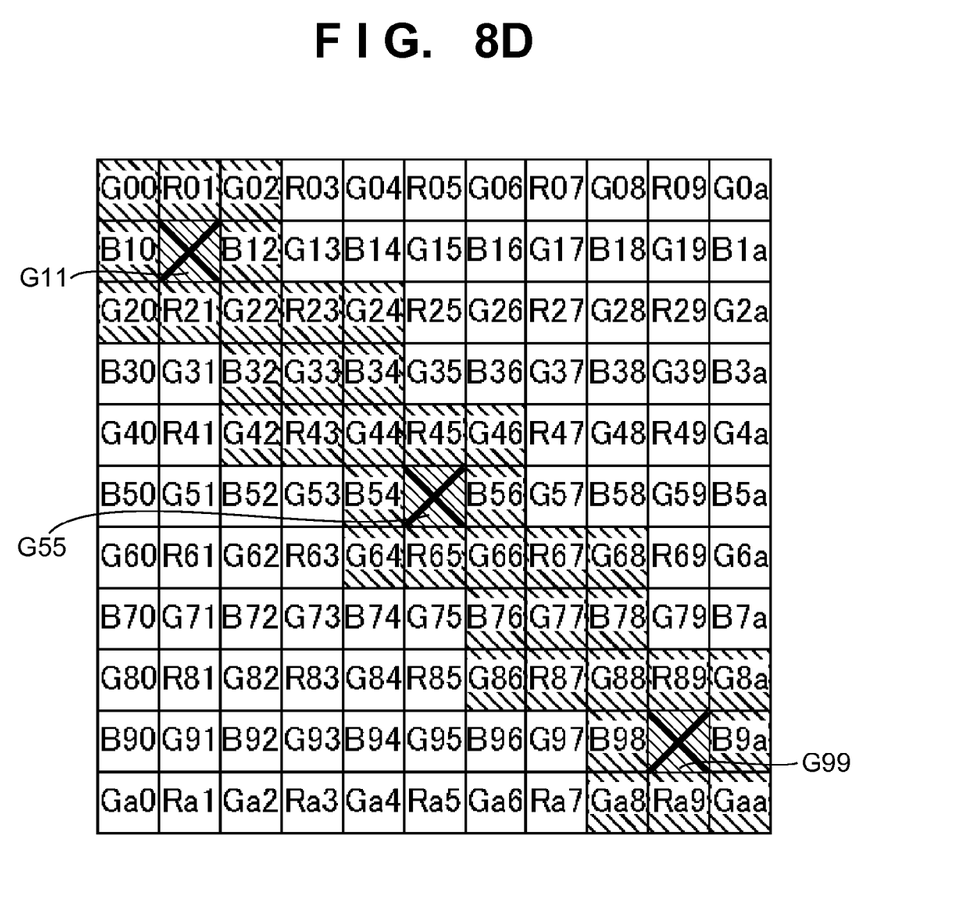

Also, the pixel correction circuit 103 moves to the processing of step S202, determines the direction in which the defective pixels are arranged based on the counting result, and sets the first to third regions 1000 to 1002. Here, the direction having the largest number of counted defective pixels is determined as the direction in which the defective pixels are arranged. FIGS. 8A to 8D show first regions 1000 in cases where the horizontal direction, vertical direction, 45-degree direction, and 135-degree direction are determined as the arrangement directions. FIGS. 8A to 8C also show second regions 1001 and third regions 1002. In the case of the 135-degree direction shown in FIG. 8D as well, it is possible to determine the second and third regions 1001 and 1002 in a similar manner to those of the 45-degree direction shown in FIG. 8C.

When the thus-determined first to third regions are set, the processing moves to step S203, and defective pixel correction is performed. The operation of step S203 is the same as that described with reference to the flowchart shown in FIGS. 3A and 3B in the first embodiment, and therefore detailed description thereof will be omitted here.

According to the present embodiment, in addition to the effects of the first embodiment, it is possible to set a suitable arrangement direction of defective pixels for each target pixel. For example, it is possible to suitably adapt to a case in which defective pixels increase in number over the years, and the like.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-135166, filed on Jun. 30, 2014, which is hereby incorporated by reference herein in its entirety.

What is claimed is:

1. An image processing apparatus comprising:
a setting unit configured to set a first region that includes a target pixel on which pixel correction is to be performed, and that extends in a first direction, and further configured to set a plurality of regions obtained by shifting the first region by a predetermined amount in directions perpendicular to the first direction;
a detection unit configured to detect correlation values in each of a plurality of positions in the first region and the plurality of regions by scanning the first region and the plurality of regions using a region of a plurality of pixels including the target pixel as a template;

a selection unit configured to select pixel values in the first region and the plurality of regions based on the correlation values;

a first obtaining unit configured to obtain a first correction value using a plurality of the selected pixel values;

a second obtaining unit configured to obtain a weight for the first correction value based on a magnitude of a first correlation value, which is obtained using the correlation values for pixel values that are used for obtaining the first correction value, and a magnitude of the correlation value for the pixel value selected in the first region;

a third obtaining unit configured to obtain a second correction value based on the first correction value and the pixel value selected in the first region, using the weight; and a correction unit configured to correct the value of the target pixel using the second correction value.

2. The image processing apparatus according to claim 1, wherein
if a difference between the first correlation value and the correlation value corresponding to the pixel value selected in the first region is greater than or equal to a pre-determined first threshold value, the second obtaining unit obtains the weight such that the pixel value selected in the first region is used for the second correction value and the first correction value is not used.

3. The image processing apparatus according to claim 2, wherein
if the difference between the first correlation value and the correlation value corresponding to the pixel value selected in the first region is less than or equal to a second threshold value that is smaller than the first threshold value, the second obtaining unit obtains the weight such that the first correction value is the second correction value.

4. The image processing apparatus according to claim 2, wherein
if the difference between the first correlation value and the correlation value corresponding to the pixel value selected in the first region is greater than or equal to the pre-determined first threshold value, the second obtaining unit obtains the weight such that the pixel value selected in the first region is the second correction value.

5. The image processing apparatus according to claim 1, wherein
as the correlation values, the first obtaining unit uses sums of absolute differences between a plurality of pixels excluding the target pixel in a region of a plurality of pixels including the target pixel, and corresponding pixels in the first region and the plurality of regions at a scanning position.

6. The image processing apparatus according to claim 1, wherein
the first obtaining unit obtains the first correction value using the plurality in sequence starting from the pixel value corresponding to the correlation value indicating the highest correlation among the selected pixel values.

7. The image processing apparatus according to claim 1, wherein
from positional information of pixels to be subjected to the pixel correction, the setting unit obtains the direction in which pixels to be subjected to the pixel correction are arranged.

8. The image processing apparatus according to claim 1, wherein
according to a result of counting a number of pixels to be subjected to correction included in a plurality of lines with different length directions that pass through the target pixel, based on positional information of the pixels to be subjected to the pixel correction, the setting unit sets the direction in which pixels to be subjected to the pixel correction are arranged.

9. The image processing apparatus according to claim 1, wherein
pixels to be subjected to the pixel correction include focus detection pixels arranged regularly in a specific direction.

10. An image processing method comprising:
a setting step of setting a first region that includes a target pixel on which pixel correction is to be performed, and that extends in a first direction, and setting a plurality of regions obtained by shifting the first region by a predetermined amount in directions perpendicular to the first direction;

a detecting step detecting correlation values in each of a plurality of positions in the first region and the plurality of regions by scanning the first region and the plurality of regions using a region of a plurality of pixels including the target pixel as a template;

a selecting step of selecting pixel values in the first region and the plurality of regions based on the correlation values;

a first obtaining step of obtaining a first correction value using a plurality of the selected pixel values;

a second obtaining step of obtaining a weight for the first correction value based on a magnitude of a first correlation value, which is obtained using the correlation values for the pixel values that are used for obtaining the first correction value, and a magnitude of the correlation value for the pixel value selected in the first region;

a third obtaining step of obtaining a second correction value based on the first correction value and the pixel value selected in the first region, using the weight; and a correcting step in which a correction unit corrects the value of the target pixel using the second correction value.

11. A non-transitory computer-readable storage medium storing a program for causing a computer to function as the units of the image processing apparatus according to claim 1.

* * * * *